May 26, 1964 N. B. GRANBERG 3,134,422

FLOATING PUNCH FOR FORMING OUTWARDLY EXTENDING BOSSES ON NARROW WEBBED CHANNEL MEMBERS

Filed June 20, 1961 4 Sheets-Sheet 1

INVENTOR.
NEIL B. GRANBERG

BY Andrus & Starke

Attorneys

INVENTOR.
NEIL B. GRANBERG
BY
Andrus & Starke
Attorneys

May 26, 1964 N. B. GRANBERG 3,134,422

FLOATING PUNCH FOR FORMING OUTWARDLY EXTENDING BOSSES ON NARROW WEBBED CHANNEL MEMBERS

Filed June 20, 1961 4 Sheets-Sheet 3

INVENTOR.
NEIL B. GRANBERG

BY Andrus & Starke

Attorneys

INVENTOR.
NEIL B. GRANBERG
BY Andrus & Starke
Attorneys

United States Patent Office 3,134,422

Patented May 26, 1964

3,134,422

FLOATING PUNCH FOR FORMING OUTWARDLY EXTENDING BOSSES ON NARROW WEBBED CHANNEL MEMBERS

Neil B. Granberg, Wauwatosa, Wis., assignor to A. O. Smith Corporation, Milwaukee, Wis., a corporation of New York Filed June 20, 1961, Ser. No. 118,387
16 Claims. (Cl. 153—25)

This invention is directed to a device for forming outwardly extending bosses in the opposite flanges of a narrow webbed channel member.

In the past, it was very difficult to form outwardly extending bosses in a narrow webbed channel member of the type and size used for a control arm in an automobile suspension system. Due to the forming problem, it was not considered feasible to design such a structure for mass produced automobiles.

Conventional punches are connected to their drive means in such a manner that they cannot readily be inserted inside a narrow webbed channel member to form opposite outwardly extending bosses in the flanges. The limited space between the flanges greatly restricts the space that would be necessary to accomplish the forming strokes. If a control arm incorporating the above design could be mass produced, it would be very desirable from the standpoint of stability, since the outwardly extending bosses provide a relatively longer pivotal attachment sleeve integral with the control arm, and therefore, a more rigid suspension member.

The apparatus of the invention comprises a mandrel having a passage containing a double ended punch member slidably disposed in the passage. The double ended punch member has recesses in the opposite ends, and has a groove in its peripheral surface which is adapted to be engaged by a centering pin to center the punch member in the mandrel. Contoured clamping dies are disposed coaxially with the punch member and the passage in the mandrel and are adapted to move towards and away from the mandrel. Each clamping die has a central opening in which is disposed a drive member which is adapted to move relative to the clamping die and engage the punch member from one end and drive the punch member out through the opposite end of the passage in the mandrel to form an outwardly extending boss by cooperation with the opposite clamping die. The opposite drive member engages and stabilizes the punch member on the opposite end.

The contoured clamping dies and their respective drive members contained therein are each supported by a slide assembly disposed on opposite sides of the mandrel. Each slide assembly includes hydraulic drive means connected to both the clamping dies and the drive members for the double ended punch member. The hydraulic drive means is adapted to drive the clamping dies and the drive members towards and away from the mandrel independently of each other.

The hydraulic drive means are actuated in a predetermined sequence by an electrical control system which is connected thereto by means of solenoid valves.

The mandrel is mounted on the central part of a frame, which is also adapted to slidably receive the slide assemblies and supports the hydraulic drive means.

The mandrel is shaped to receive a narrow webbed channel member having a web and a pair of flanges. The channel member has pilot holes in the flanges, and when it is correctly positioned on the mandrel, the mandrel passage, the double ended punch member, the passages in the contoured clamping dies, and the drive members are all coaxially aligned.

In the forming sequence, the slide assemblies are initially disposed away from the mandrel. The workpiece is placed on the mandrel with the pilot holes aligned, as described immediately above. The electrical control system is then actuated, causing the slide assemblies to move in towards the mandrel and the clamping dies to engage the opposite flanges of the workpiece. The drive members move inwardly through the pilot holes in the opposite flanges to engage the punch member inside the mandrel from the opposite ends.

A solenoid valve is signalled at the end of the clamping stroke to cause the hydraulic means to drive the right hand drive member to the left. The motion of the right hand drive member moves the punch off the centering pin and out of the mandrel through the pilot hole in the left hand flange in the first forming stroke. As the punch moves to the left, it carries with it the left hand drive member, which retracts into the right hand clamping die. The completion of the first forming stroke is reached as the punch forces the portion of the left hand flange adjacent the left hand pilot hole out against the left hand clamping die to form an outwardly extending boss in the flange.

At the end of the first forming stroke, the left hand drive member is driven to the right to move the punch to the right through the pilot hole in the right hand flange, thereby forming an outwardly extending boss in the right hand flange. At the end of the second forming stroke, a third solenoid valve is energized, causing the hydraulic drive means to drive the right hand drive member to the left only to the center position for the punch, so that the punch is disposed inside the mandrel.

At the end of the centering stroke, a fourth solenoid is energized, causing the slide assemblies, and with them, the clamping dies and drive members to be retracted away from the mandrel, clearing the completed workpiece for removal. The cycle may then be repeated.

The unique construction of the double ended punch, in cooperation with the specially adapted clamping dies and drive members provides a novel forming apparatus which makes possible the mass production of a control arm having a narrow channel portion incorporating a relatively longer pivotal attachment sleeve integral with the control arm. The electrical control system of the invention makes it possible to automatically sequence the strokes of the forming operation to take advantage of the possible economies in production.

The drawings illustrate the best mode presently contemplated for carrying out the invention.

Figures 1, 2, 3:
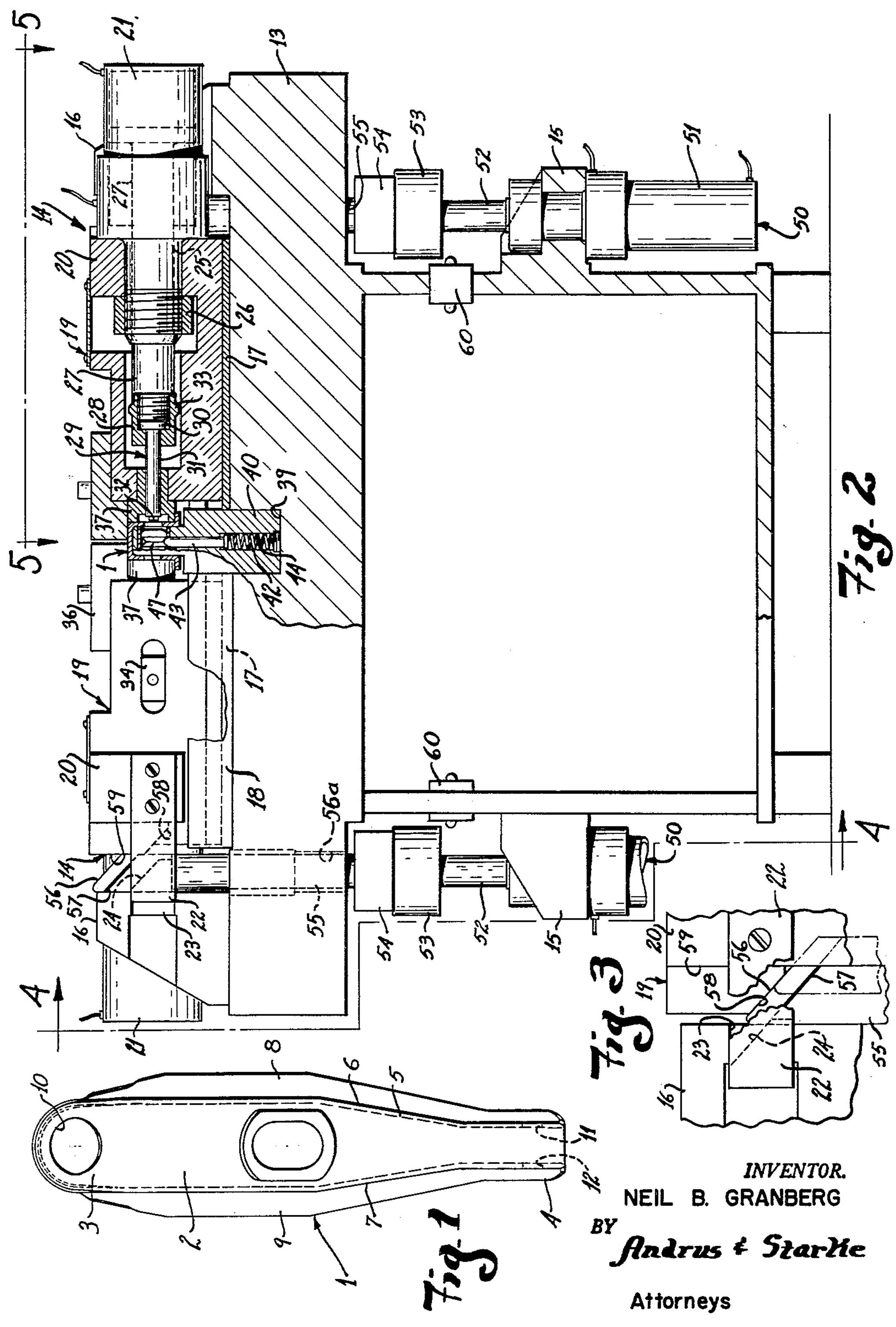
FIGURE 1 is a top plan view of the workpiece to be formed by the method of this invention.
FIG. 2 is a front plan view with parts broken away for clarity of the hydraulic extruding press of the invention.
FIG. 3 is a fragmentary detail of the cam portion of slide assembly of the press shown in FIG. 2.
Figure 4:
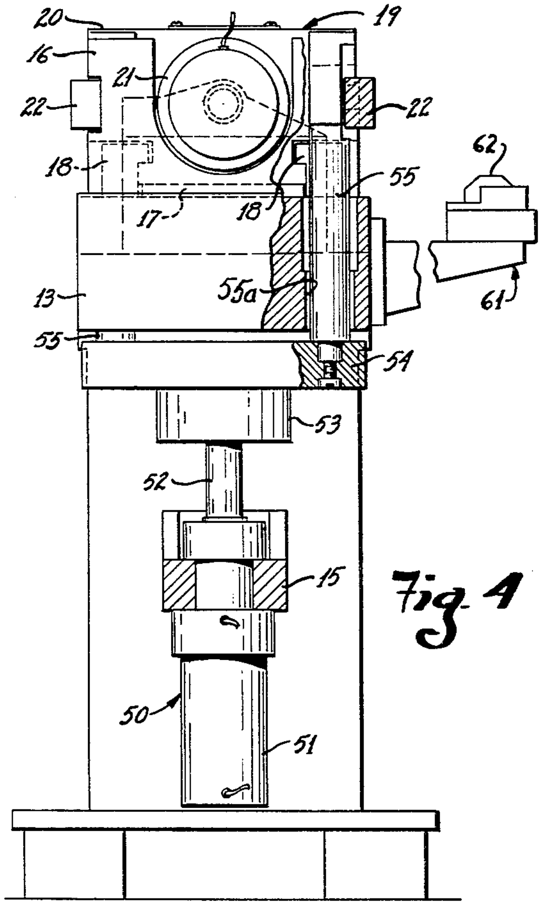
FIG. 4 is a view taken generally on line 4—4 of FIG. 2.
Figure 6:
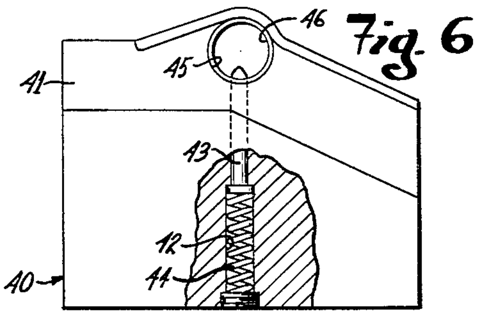
FIG. 6 is a side elevation of the mandrel shown in FIG. 2 with parts broken away for clarity.
Figure 7:
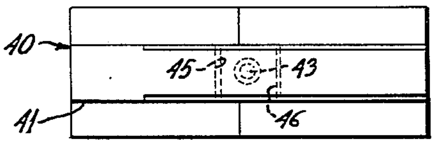
FIG. 7 is a top plan view of the mandrel.
Figure 8:
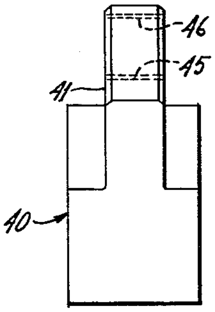
FIG. 8 is an end elevational view of the mandrel.
Figure 5:
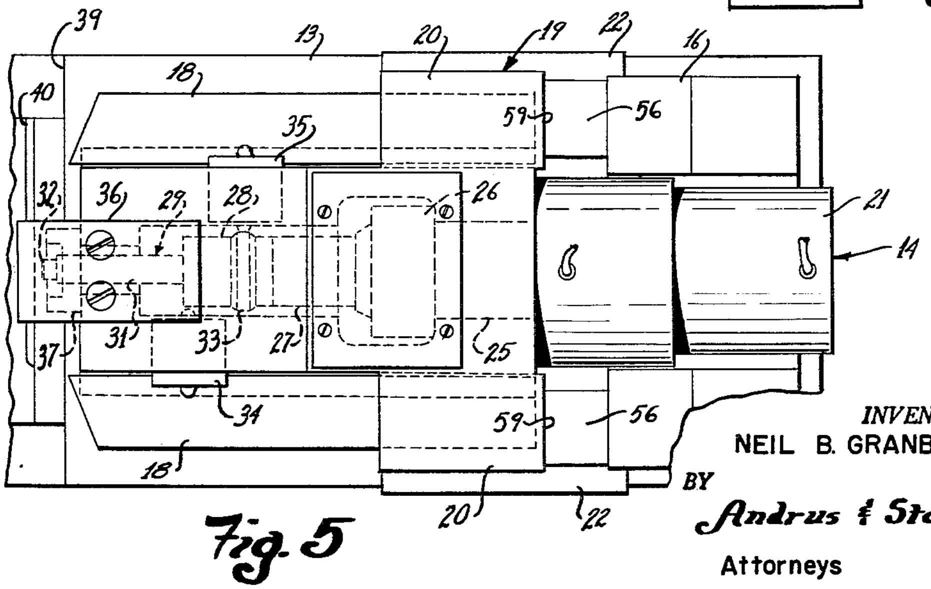
FIG. 5 is a partial top plan view taken generally on line 5—5 of FIG. 2.

As shown in FIGURE 1 of the drawings, a workpiece 1, which is a partially completed control arm for a vehicle wheel suspension system, includes a body 2, a wide end 3, and a narrow end 4. The workpiece 1 is generally hat-shaped in cross sectional and includes a web 5, a pair of side flanges 6 and 7 and a pair of wing flanges 8 and 9. There is a relatively large opening 10 in the body 2 near the wide end 3 of the control arm. A pair of axially aligned pilot holes 11 and 12 are disposed in the side flanges 6 and 7 of the workpiece 1, respectively, near the narrow end 4 thereof.

As can be seen in FIGURE 1, the web 5 of the workpiece 1 is relatively narrow in the area adjacent the pilot holes 11 and 12, thus creating the need for a specially adapted forming apparatus to form the metal adjacent the pilot holes 11 and 12 in the manner of this invention.

As shown in the drawings, the apparatus for accomplishing this forming operation comprises a frame 13, which supports a hydraulic press assembly 14. The frame 13 also has a pair of cylinder brackets 15 secured to the sides thereof, a pair of vertical U-shaped extensions 16, and a pair of friction plates 17 are bolted to the top of the frame 13 to define a substantially horizontally slide surface. A pair of gibs 18 are also secured to the top of the frame at both ends and each pair is adapted to receive and slidably retain a slide assembly 19.

Each slide assembly 19 includes a pair of slide blocks 20, a pair of horizontal hydraulic cylinders 21, a pair of guide bars 22, which are bolted to the slide blocks 20, and which also ride in grooves 23 in the vertical extensions 16 of the frame 13. Each guide bar 22 has a cam surface 24 cut into its inside vertical surface. Each cylinder 21 is secured to the rear portion of the slide block 20 by means of a cylinder collar 25 fastened in relation to slide block 20 by a nut 26 so that the cylinder 21 moves with the slide assembly 19.

A piston rod 27 extends out through the inner end of each cylinder 21 and through the cylinder collar 25. The end of the piston rod 27 connects by means of a threaded collar 28 to a rod shaped drive member 29. Each drive member 29 has a head 30 adapted to be retained inside the threaded collar 28, a shank 31, and a knob-like inner end 32 of smaller diameter than the shank 31. The outer surface of the threaded collar 28 includes an annular raised portion 33, which actuates limit switches 34 and 35 which are secured to the slide block 20. Each slide assembly 19 is shown having a wiper block 36 secured to the top and extending inwardly toward the opposite slide assembly 19. A contoured clamping die 37 having a central horizontal passage 38 extending therethrough is secured to the inner end of each slide assembly 19 and is adapted to move with the slide assembly 19.

Each drive member 29 is slidably received in the horizontal passage 38 of the respective clamping die 37 and each drive member 29 is adapted to move relative to its clamping dies 37 and its slide assembly 19.

The frame 13 also has a central recess 39 adapted to receive a mandrel 40. The mandrel 40 includes a saddle 41 and has a vertical passage 42 of stepped diameter for receiving a centering pin 43 and a coil spring 44. The coil spring 44 biases the centering pin 43 upwardly into a horizontal passage 45 in the saddle 41. The horizontal passage 45 is lined with a sleeve bushing 46 and a double ended punch 47 is slidably disposed in the passage 45 in the bushing 46. The double ended punch 47 has an annular groove 48 around its central peripheral portion into which the centering pin 43 extends when the punch 47 is centered in the passage 45.

The double ended punch 47 also has a horizontal opening 49 extending therethrough. The opening 49 is adapted to receive the knob-like inner ends 32 of the drive members 29. The drive members 29, the clamping dies 37, the double ended punch 47, the opening 49 and the horizontal passage 45 in the saddle 41 are all coaxially disposed so that when the drive members 29 engage the double ended punch 47, the punch can be moved into and out of each clamping die 37. Each slide assembly 19 is adapted to move towards and away from the mandrel 40, being driven by a vertically disposed wedging cylinder assembly 50. Each wedging cylinder assembly 50 is supported by the cylinder brackets 15 on the ends of the frame 13.

The wedging cylinder assemblies 50 each include a hydraulic cylinder 51, a piston rod 52, a collar 53, a tie plate 54 and a pair of cam bars 55.

The piston rod 52 extends upwardly from the top end of the hydraulic cylinder 51 and connects to the collar 53, which is connected to the tie plate 54. The cam bars 55 are connected to the tie plate 54 at their lower ends, and the tie plate 54 provides a connecting means between the pair of cam bars 55 and the piston rod 52, so that the piston rod 52 provides driving means for both cam bars 55.

As best shown in FIG. 2, the upper portion of the frame 13 extends out over the wedging cylinder assemblies 50. Each overhanging end of the frame 13 has a pair of vertically disposed cam bar passages 55*a* which slidably receive the cam bars 55.

Each cam bar 55 has a pair of diagonal cam surfaces 56 and 57 at its upper end, and each slide block 20 has a diagonal cam surface 58 which is parallel to the cam surfaces 56 and 57 and also parallel to the cam surface 24 on the guide bar 22. As shown in FIGURES 2 and 3, the cam surfaces 56 and 57 fit between the complimentary cam surfaces 58 and 24, except when the slide assembly 19 is disposed immediately adjacent the mandrel 40. The cam surfaces 58 and 24 are slightly offset, so that at the innermost position of the slide assemblies 19, the cam bars 55 extend slightly above the cam surface 58 on the slide block 20 and rest against the vertical surface 59, to provide a positive locking means for the slide assemblies 19 during the forming operations. Each wedging cylinder assembly 50 is provided with a limit switch 60 which is mounted on the frame 13. The limit switch 60 is actuated in response to the motion of the piston rod 52 to sense when the slide assemblies 19 are in the closed position.

A pilot bracket 61 is connected to the front portion of the frame 13 adjacent the mandrel 40. A pilot 62 on the pilot bracket 61 is adapted to cooperate with the saddle 41 to support and stabilize the workpiece 1 during the forming operation. The large opening 10 in the workpiece 1 is adapted to be disposed over the pilot 62 during the forming operation. The narrow end 4 of the workpiece 1 is supported on the saddle 41 with the pilot holes 11 and 12 horizontally aligned with the passage 45 in the saddle 41, which contains the double ended punch 47. The pilot holes 11 and 12 are axially aligned, and are large enough to receive drive members 29.

After the workpiece 1 has been loaded on the saddle 41, the apparatus is automatically sequenced through a series of forming motions to form a par of outwardly extending bosses 63 and 64 in the side flanges 6 and 7 of the workpiece. The detailed sequence of the forming action of the double ended punch 47 is best shown by the enlarged sectional views of FIGURES 9 to 12.

Figure 9:
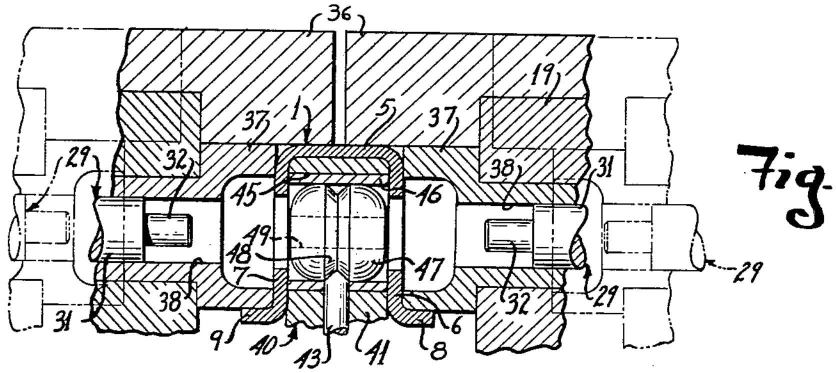
FIG. 9 is a diagrammatic drawing of the workpiece prior to forming of bosses with the clamping dies and drive rods in the retracted position.

FIG. 9 shows the workpiece 1 disposed on the saddle 41 and contoured clamping dies 37 in the clamped position against the side flanges 6 and 7. The wing flanges 8 and 9 of the workpiece are shown extending out under the clamping dies 37, which further stabilizes the workpiece against motion during the forming operation.

The right and left hand drive members 29 then slide through the clamping dies 37 and the pilot holes 11 and 12 and into the horizontal passage 45 of the saddle 41, the inner ends 32 of the drive members 29 engage and fit snugly inside the recesses 49 of the punch 47.

Figure 10:
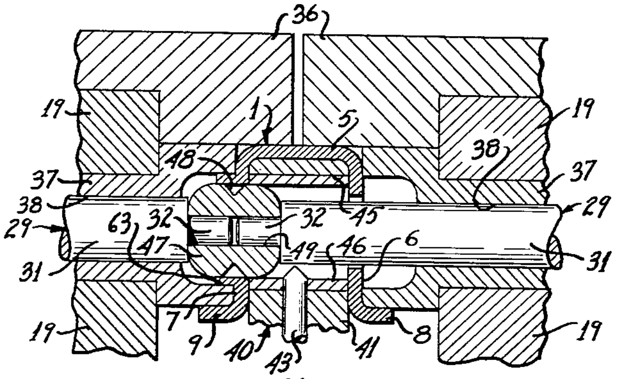
FIG. 10 is similar to FIG. 8 and showing the clamping dies closed and the positions of the drive rods after completion of the first forming step.

The right hand drive member 29 then moves to the left as shown in FIG. 10, forcing the punch 47 off the centering pin 43 and out through the pilot hole 11 in the left side flange 6, thereby forcing the flange 6 against the left clamping die 37 to form the boss 63. The left hand drive member 29 is carried along to the left by the movement of the punch 41 and the right hand drive member 29, retracting into the left hand clamping die 37. The positive engagement of the punch 41 by both drive members 29 centers and stabilizes the punch to insure a smooth forming stroke.

Figure 11:
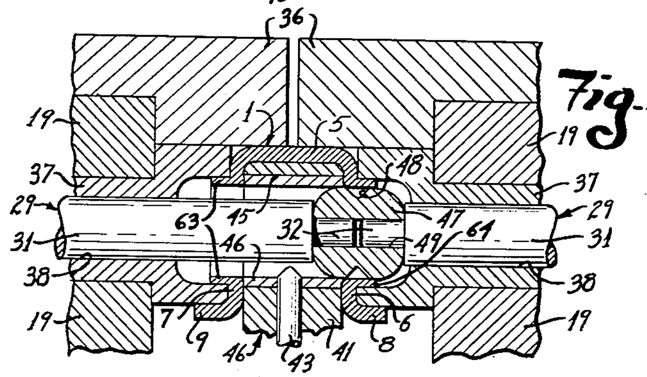
FIG. 11 is similar to FIG. 9 and shows the positions of the rod after the second forming operation.
Figure 13:
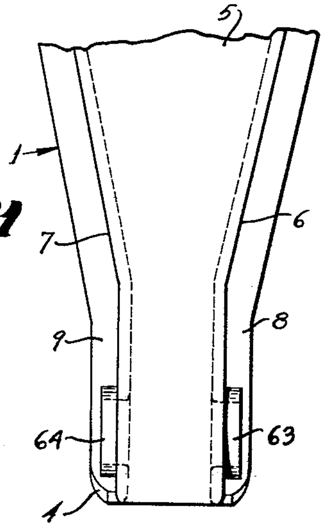
FIG. 13 is a detailed portion of the workpiece shown in FIGURE 1.
Figure 12:
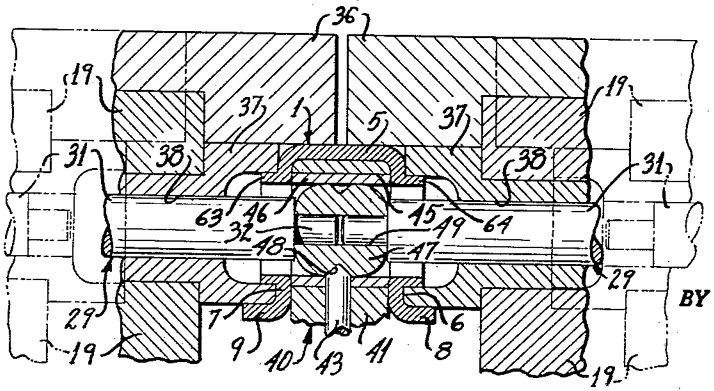
FIG. 12 is similar to FIG. 9 and shows the completed workpiece ready for removal from the mandrel.

At this point, the left hand drive member 29 takes over control of the punch 47, moving it back to the right through the passage 45, and out further into the pilot hole 12 to form the boss 64 in the right side flange 7, as shown in FIG. 11. The right hand drive member again takes control to commence the partial centering stroke, which again positions the punch 47 in the center of the saddle 41. The centering pin then extends into the groove 48 to hold the punch 47 inside the saddle 41 while the drive members are retracted to the positions shown in FIG. 9. After the slide assemblies 19 are retracted, the completed workpiece 1, having a pair of outwardly extending bosses 63 and 64, may be removed and the cycle repeated.

Figure 14:
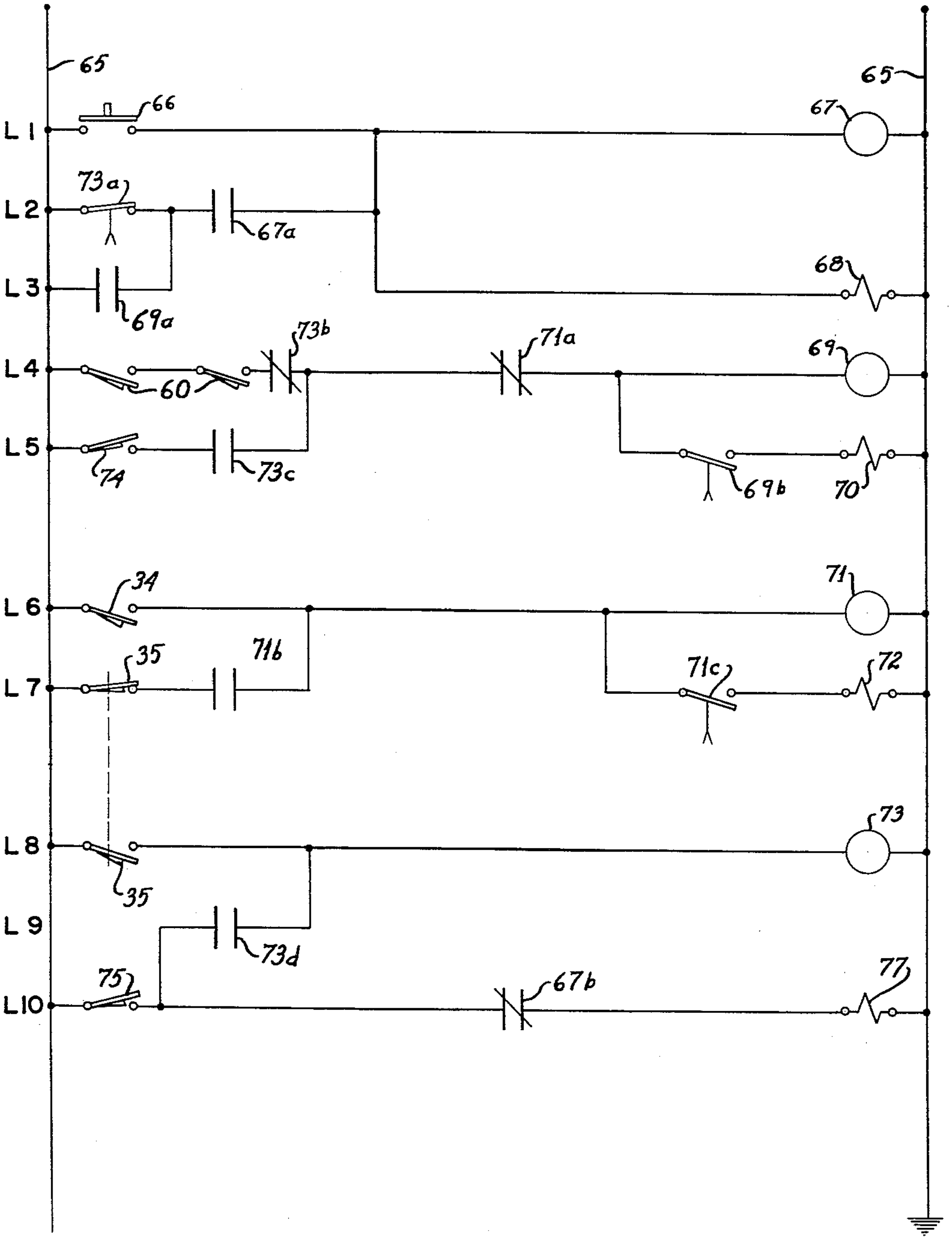
FIG. 14 is a circuit drawing showing the electrical control circuit for the press.

The electrical control system for accomplishing the sequence of motions necessary for the above described forming operations is shown in FIG. 14 of the drawings.

As shown at line 1 of FIG. 14, the control circuit is connected to a standard 110 v. power source at power lines 65. The operating sequence of the apparatus is commenced by closing a manual pushbutton switch 66 in L1 energizing relay 67 in L1 and also energizing solenoid 68 in L3. Energizing relay 67 closes relay contacts 67*a* in L2 to lock in the relay 67 and opens normally closed contacts 67*b* in L10, while energizing solenoid 68 causes hydraulic fluid to flow into the lower ends of the wedging cylinders 51, thus raising cam bars 55 driven by the piston rods 52. The cam bars 55 drive the slide assemblies 19 inwardly toward the workpiece.

When the cam bars 55 reach the upper end of the wedging stroke, limit switches 60 are closed thereby energizing timer relay 69 in L4. After a timing period of sufficient duration to assure the completion of the wedging strokes, the contacts 69*a* and 69*b* in L3 and L5, respectively, are closed. Closing of contacts 69*b* energizes solenoid 70 which controls a valve to admit hydraulic fluid into the outer end of the right hand cylinder 21, causing piston rod 27 to move to the left and moving the drive member 29 through the first forming stroke described above.

At the end of the first forming stroke, limit switch 34 in L6 is tripped energizing timer relay 71 in L6. Energizing relay 71 opens normally closed contacts 71*a* in L4 to de-energize relay 69 and solenoid 70 and close normally open contacts 71*b* in L7. After a short time relay contacts 71*c* in L7 are closed to energize solenoid valve 72 which controls a valve to admit hydraulic fluid to the left hand cylinder 21 and move the driving member 29 to the right through the second forming stroke.

At the end of the second forming stroke, limit switch 35 in L7 is tripped, opening the circuit through L6 and de-energizing relay 71, thereby opening contacts 71*c* to de-energize solenoid 72.

Tripping limit switch 35 also energizes timer relay 73 in L8 and this opens contacts 73*a* in L2, opens normally closed contacts 73*b* in L4, closes contacts 73*c* in L5 and closes contacts 73*d* in L9.

At the end of the second forming stroke a limit switch 74 in L5 is closed by the right hand cylinder 21 and as contacts 73*c* in L5 are closed, timer relay 69 is again energized to energize solenoid 70 causing the right hand driving member 29 to start the centering stroke. When the center position is reached, limit switch 74 is tripped and opened to thereby de-energize relay 69 and consequently stopping the movement of the driving member 29 and punch 47.

In the meantime timing contacts 73*a* in L2 have opened and with contacts 69*a* in L3 open, relay 67 is de-energized. De-energizing relay 67 closes contacts 67*b* in L10, and with limit switch 75 in L10 closed, solenoid 76 is energized. The energizing of solenoid 76 opens a valve to admit hydraulic fluid into the upper ends of wedging cylinders 51 and retracts the slide assemblies 19 by the wedging action at the cam surfaces 24 and 57.

At the end of the retracting stroke, limit switch 75 is tripped and opened, thereby de-energizing solenoid 76 in L10 and relay 73 in L8. The circuit is now back in the starting condition with the slide assemblies 19 withdrawn, so that the completed workpiece 1 can be removed and the cycle repeated.

The apparatus of this invention provides an automatic forming means for forming two outwardly extending bosses in the opposite flanges of a narrow webbed channel member. Because of the obvious economies of the forming method, it is possible to incorporate this desirable control arm design into vehicle suspensions for mass produced vehicles.

Various modes of carrying out the invention are contemplated as being within the scope of the following claims particularly pointing out and distinctly claiming the subject matter which is regarded as the invention.

I claim:

1. Apparatus for forming a workpiece, comprising a punch having a plurality of forming faces and adapted to be driven in a plurality of directions, a plurality of driving members adapted to successively engage and drive said punch from the side opposite the respective forming face to be driven, and means for supporting said punch and said driving members in relation to a workpiece being formed.

2. The apparatus of claim 1 in which the means for supporting said punch and said driving members includes a mandrel having a saddle portion adapted to receive a workpiece thereon, said saddle portion having an opening extending therethrough, said punch being slidably disposed in said opening and supported by said mandrel.

3. The apparatus of claim 1, and including a plurality of dies supported by said means for supporting said punch and said driving members said dies each being adapted to cooperate with one of said forming faces of said punch to form a portion of said workpiece.

4. The apparatus of claim 3 in which each of said plurality of dies has an opening therein for slidably receiving one of said driving members in said opening, said driving member being movable relative to said die, and said dies being co-operable with said driving members to hold the workpiece in position during the successive forming operations.

5. An apparatus for forming outwardly extruded bosses in the flanges of a narrow webbed channel member, comprising a frame, a mandrel supported by said frame and having an opening therein and said mandrel having a supporting surface disposed to support the web portion of said channel member with the flanges of the channel member being disposed across the opening, a double ended punch slidably disposed in the opening in said mandrel, said punch having openings in the first and second ends thereof, a first independently movable driving pin supported by said frame and disposed on one side of said mandrel, said first driving pin being disposed to engage the opening in the first end of said punch and drive said punch along a predetermined axis outwardly against a flange of said workpiece, a second independently movable driving pin similar to said first driving pin disposed on the opposite side of said mandrel, said second driving pin being disposed to engage the opening in the second end of said punch and drive said punch oppositely along said predetermined axis outwardly against the other flange of said workpiece, and means for driving said driving pins in succession thereby driving said punch in opposite directions to form outwardly extending bosses in the opposite flanges of said narrow webbed channel member.

6. The apparatus of claim 5 and including a pair of clamping dies for restraining said channel member on said mandrel, said clamping dies being co-operable with the opposite ends of said punch to restrain and form the flanges of said channel member during forming.

7. The apparatus of claim 6 in which the clamping dies each have a central opening therein for slidably receiving said driving pins, thereby guiding said driving pins into engagement with the respective ends of said double ended punch.

8. An apparatus for forming outwardly extruded bosses in the flanges of a narrow webbed channel member, comprising a frame, a mandrel supported by said frame and having a passage therein and said mandrel having a supporting surface disposed to support the web portion of said channel member and the flanges of the channel member having aligned openings disposed in alignment with the passage in said mandrel, a double ended punch slidably disposed within the passage in said mandrel, a first independently movable driving member supported by said frame and disposed on one side of said mandrel to pass through the opening in the nearest flange of said workpiece, and engage the punch to drive the punch along a predetermined axis outwardly against the opposite flange of said workpiece, a second independently movable driving member also supported by said frame disposed on the opposite side of said mandrel to pass through the other opening in the other flange of said workpiece and engage the punch to drive the punch along said predetermined axis in the opposite direction against the other flange of said workpiece, means for driving said driving members in succession to thereby enable said double ended punch to form outwardly extending bosses in the opposite flanges, and centering means operable associated with the mandrel for yieldably engaging the punch and centering the punch within the mandrel.

9. The structure of claim 8 in which the punch is provided with a circumferential groove and the centering means includes a pin yieldably mounted within the mandrel and disposed to engage said circumferential groove in the punch to center the punch within the mandrel after completion of the boss-forming operations.

10. An apparatus for forming outwardly extruded bosses in the flanges of a narrow webbed channel member, comprising a frame, a mandrel supported by said frame and having a passage therein and said mandrel having a supporting surface disposed to support the web portion of said channel member and the flanges of the channel member having aligned openings disposed in alignment with the passage in said mandrel, a double ended punch slidably disposed within the passage in said mandrel, a pair of independently movable driving members supported by said frame and disposed on opposite sides of said mandrel, said driving members each being disposed to pass through the respective openings in the flanges and engage the punch and drive the punch in one direction along a common axis, first drive means operably connected to a first of said driving members for moving the driving member through the opening in a first of said flanges and into engagement with the punch and thereby driving the punch through the opening in the opposite flange to form an outwardly extending boss in said opposite flange, second drive means associated with the second driving member for moving the second driving member through said opposite flange and into engagement with the punch and driving the punch through the opening in said first flange to form an outwardly extending boss in said first flange, means responsive to a given stroke of movement of said first drive means for actuating said second drive means, and means responsive to a given stroke of movement of said second drive means for actuating said first drive means and returning the punch to a centered position within the mandrel.

11. An apparatus for forming outwardly extruded bosses in the flanges of a narrow webbed channel member, comprising a frame, a mandrel supported by said frame and having a passage therein and said mandrel having a supporting surface disposed to support the web portion of said channel member and the flanges of the channel member having aligned openings disposed in alignment with the passage in said mandrel, a double ended punch slidably disposed within the passage in said mandrel, a pair of independently movable driving members supported by said frame and disposed on opposite sides of said mandrel, said driving members each being disposed to pass through the respective openings in the flanges and engage the punch and drive the punch in one direction along a common axis and outwardly against the opposite flange of said workpiece to form a boss therein, a pair of clamping dies mounted on the frame for clamping said channel member on the mandrel, said clamping dies each being operable with one end of said punch to restrain and form the flange of said channel members disposed between said die and said punch, means responsive to movement of said clamping dies into clamping engagement with the channel member for actuating a first of said driving members to thereby drive said member through an opening in a first flange of the channel member and into engagement with the punch and to drive the punch through the opening in the opposite flange of the channel member to form an outwardly extending boss in said opposite flange, means responsive to a given stroke of movement of the first driving member for actuating the second driving member to move said second driving member through the opening in said opposite flange and into engagement with the punch and to drive the punch through the opening in said first flange to form an outwardly extending boss in said first flange, and means responsive to a given stroke of movement of the second driving member for actuating the first driving member to move the punch to a centered position within the mandrel.

12. A method of forming outwardly extruded bosses in the flanges of a channel member, comprising disposing a channel member on a mandrel with a web portion of the channel member supported on a supporting surface of the mandrel and the flanges of the channel member containing aligned openings being disposed in alignment with a passage extending through the mandrel, said mandrel having a punch slidably disposed within the passage, inserting a driving member through an opening in one of said flanges and into engagement with the punch and driving the punch laterally through the opening in the opposite flange to provide an outwardly extending boss in said opposite flange, and moving a second driving member through the boss thus formed and into engagement with the punch to drive the punch laterally through the opening in the first flange to provide an outwardly extending boss in said first flange.

13. A method of forming outwardly extruded bosses in the flanges of a channel member, comprising disposing a channel member on a mandrel with a web portion of the channel member supported on a supporting surface of the mandrel and the flanges of the channel member containing aligned openings being disposed in alignment with a passage extending through the mandrel, said mandrel having a punch slidably disposed within the passage, inserting a driving member through an opening in one of said flanges and into engagement with the punch and driving the punch laterally through the opening in the opposite flange to provide an outwardly extending boss in said opposite flange, moving a second driving member through the boss thus formed and into engagement with the punch to drive the punch laterally through the opening in the first flange to provide an outwardly extending boss in said first flange, moving said first driving member through the second formed boss and into engagement with the punch to move the punch to a centered position within the mandrel, and removing the channel member from the mandrel.

14. A method of forming outwardly extruded bosses in the flanges of a channel member, comprising disposing a channel member on a mandrel with the web portion of the channel member being supported on a supporting surface of the mandrel and the flanges of the channel member containing aligned openings disposed in alignment with a passage extending through the mandrel, said mandrel having a punch slidably disposed within the passage, clamping the flanges of the channel member against the adjacent surfaces of the mandrel, inserting a pair of driving members from opposite sides of the channel member through the openings in said flanges and into engagement with opposite ends of the punch while the punch is centered within the mandrel, moving a first of said driving members laterally inward to thereby drive the punch through the opening in the opposite flange to form an outwardly extending boss in said flange while maintaining engagement between the second driving member and the punch, moving the second driving member laterally inward to thereby drive the punch through the opening in the flange opposite said second driving member to form an outwardly extending boss in said last named flange while maintaining engagement between said first driving member and the punch, and moving said first driving member laterally inward to move the punch to a centered position within the mandrel and thereby permit removal of the channel member from the mandrel.

15. Apparatus for forming a pair of opposite outwardly extending bosses in the opposite flanges of a narrow webbed channel member, which comprises a pair of drive members adapted to be driven independently towards and away from each other, first drive means for independently driving said drive members, means responsive to a signal for actuating said drive means sequentially, a pair of contoured clamping dies cooperable with said drive members and adapted to be driven towards and away from each other, second drive means responsive to a signal for driving said clamping dies towards and away from each other, a mandrel having an opening therein aligned with said drive members and the clamping dies and adapted to receive a workpiece to be formed, and a double ended punch, said punch having recesses in its opposite ends for engaging said drive members, said punch being slidably disposed in the opening in the mandrel and said punch adapted to be driven sequentially by said drive members to form a pair of opposite outwardly extending bosses in the opposite flanges of said narrow webbed channel member.

16. A method of forming an outwardly extruded boss in a flange of a narrow web channel member, comprising forming aligned openings in the flanges of said channel members, disposing said channel member on a mandrel with the web portion of the channel member supported on a supporting surface of the mandrel and the openings in the flanges aligned with a passage extending through the mandrel, said mandrel having a punch slidably disposed within the passage, inserting a driving member through one of the aligned openings in the flanges of said channel member and into engagement with said punch, and driving said punch through the opening in the opposite flange to form the outwardly extruded boss in said opposite flange.

References Cited in the file of this patent

UNITED STATES PATENTS 2,751,984 Kuhl ------------------ June 26, 1956